May 6, 1930.   C. H. E. REMONDINO   1,757,021
AUTOMOBILE HOOD RETAINING MEANS
Filed Feb. 7, 1927
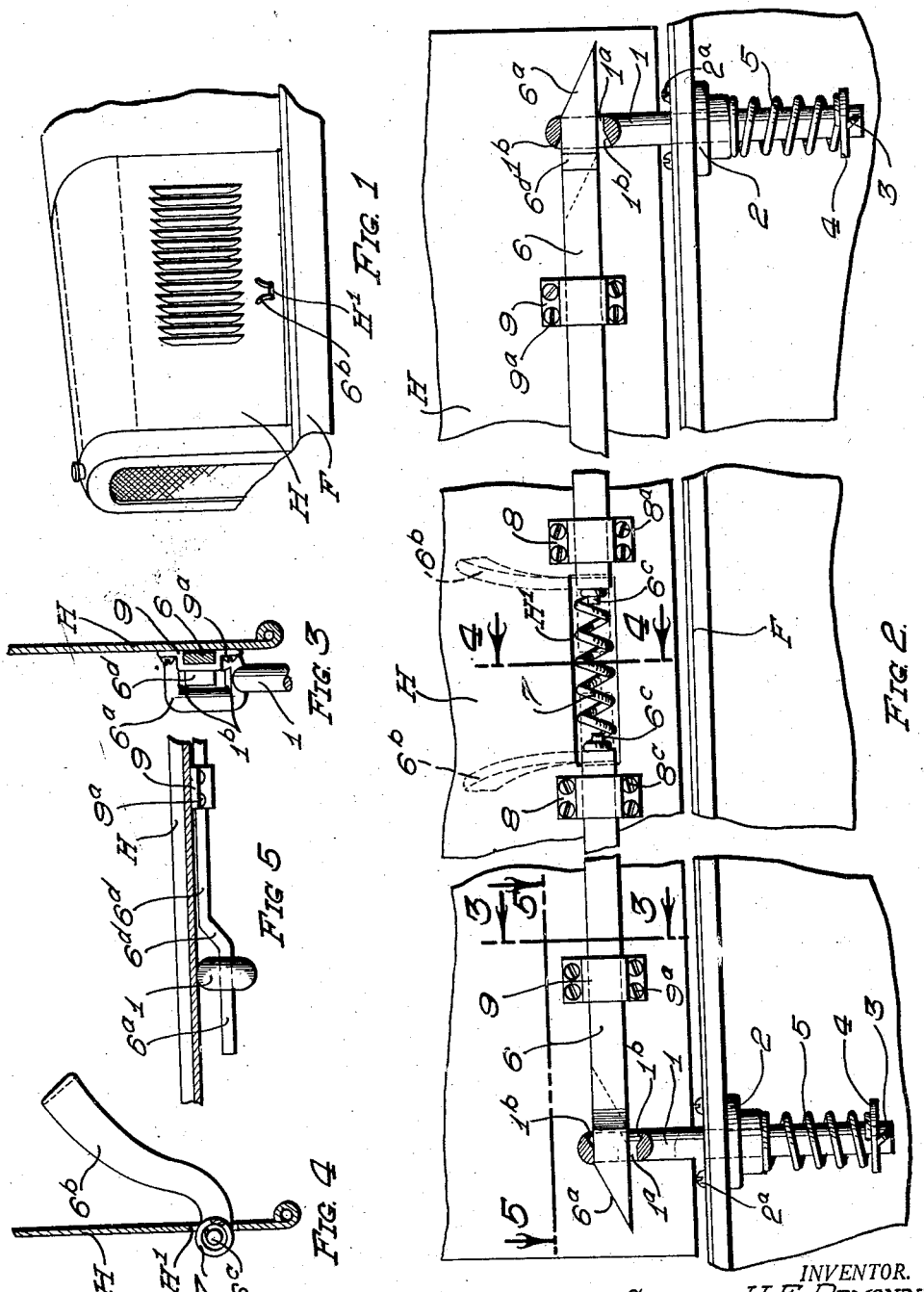
INVENTOR.
CHARLES H. E. REMONDINO
BY A. B. Bowman
ATTORNEY Patented May 6, 1930

1,757,021

UNITED STATES PATENT OFFICE

CHARLES H. E. REMONDINO, OF SAN DIEGO, CALIFORNIA, ASSIGNOR OF ONE-THIRD TO FREDERICK W. RENWORTH AND ONE-THIRD TO ARTHUR C. McBRIDE, BOTH OF SAN DIEGO, CALIFORNIA

AUTOMOBILE HOOD-RETAINING MEANS

Application filed February 7, 1927. Serial No. 166,401.

My invention relates to automobile hood retaining means, and the objects of my invention are: first, to provide a device of this class whereby one side of an automobile hood may be secured by a single operating means located near the center at the outside of each side of the hood; second, to provide a device of this class which eliminates the necessity of getting into awkward and uncomfortable positions to secure or release the hood; third, to provide a device of this class whereby the hood can be loosened and lifted or replaced and fastened with one hand; fourth, to provide a device of this class which automatically secures the hood when the hand is released from the securing means; fifth, to provide a device of this class which only needs a gripping and lifting movement of the hand to release the hood; sixth, to provide a device of this class in which all of the device except the handle is located within the hood, and seventh, to provide a device of this class which is simple and economical of construction, durable, neat in appearance, efficient in its action, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a perspective view of the left front portion of an automobile, showing the automobile hood and portions of adjacent parts with the handle of my retaining device protruding from the hood thereof; Fig. 2 is an enlarged fragmentary view of the lower portion of the inside of an automobile hood with a portion of the adjacent frame, showing my retaining device in connection therewith and with certain parts and portions broken away and in section to facilitate the illustration; Fig. 3 is a fragmentary transverse sectional view thereof through 3—3 of Fig. 2; Fig. 4 is a fragmentary transverse sectional view thereof through 4—4 of Fig. 3, and Fig. 5 is a fragmentary sectional plan view thereof through 5—5 of Fig. 3, showing the automobile hood in section with a portion of my device in plan.

Similar characters of reference refer to similar parts and portions throughout the several views of the drawings.

The bolt keepers 1, bolt keeper guides 2, pins 3, washers 4, keeper springs 5, bolts 6, bolt spring 7, and bolt guide members 8 and 9, constitute the principal parts and portions of my automobile hood retaining means.

My device is situated on the lower portion of each side of an automobile hood H. Two keeper members 1 are provided, which extend upwardly through a portion of the automobile frame F intermediate the ends of the lower portion of each side of the automobile hood. Each keeper is provided on the portion below and adjacent to the frame F with guide members 2, which are secured to the frame by means of screws $2^a$ and permit only an up and down movement of the keeper in relation to the frame. Near the lower extremity of the keeper is a pin 3, which retains a washer 4. Between the washer 4 and the keeper guide members 2 is a keeper spring 5, which tends to force the keeper downwardly in relation to the frame F. The upper portions of the keepers 1, which are just behind the lower portion and intermediate the front and rear ends of the hood, are each provided with eye portions $1^a$ which have a beveled inner portion $1^b$, as shown best in Figs. 2 and 3 of the drawings. Two latch bolts 6 are provided, which are comparatively long, flat pieces of metal, which extend from near the center of the hood to each keeper 1. At the outer end of each bolt is a beveled portion $6^a$ adapted to fit in the keeper eye $1^a$. The beveled portion acts as an inclined plane and lifts the keeper 1 as the bolt slides into the eye $1^a$. The other end or central portion of each bolt member 6 is bent outwardly and upwardly through a slot $H^1$ of the hood, thereby forming two lugs $6^b$. The two lug portions $6^b$ serve as a handle, as shown in Figs. 1 and 4 and by the dash lines in Fig. 2 of the drawings, which slide the bolts out of the eye portion 1ᵃ when the two members are pressed toward each other to the position shown by the dotted lines in Fig. 2 of the drawings. At the point where the handle lug portion 6ᵇ is bent outwardly from the bolt 6 is another small lug portion, which is a continuance of the bolt member 6. The lug portions 6ᵉ of each bolt extend toward each other and serve as retainers to keep the spring 7 in place. The spring 7 tends to hold the bolts in their secured position in the eye 1ᵃ of the keeper 1. Each bolt member is also provided with a guide member 8 near the handle portion and a guide member 9 near the beveled portion 6ᵃ. These guide members 8 and 9 are secured to the hood H by means of screws 8ᵃ and 9ᵃ, respectively. Each bolt member 6 is bent slightly outwardly from the head at 6ᵈ, thereby placing the beveled end portion 6ᵃ in alinement with the eye 1ᵃ of the keeper 1. To open the hood H, the lug or handle members 1ᵇ are gripped by the hand and squeezed together, thereby causing the bolt 6 to assume the position shown by the dotted lines in Fig. 2 of the drawings. The hood is then raised by the same hand. To close the hood, the operations are reversed: the handles 6ᵇ are gripped and squeezed together by the hand, the hood is brought down to place so that the ends of the bolt 6 are in alinement with the eyes 1ᵃ of the keeper, and the handle is released. The beveled portions 6ᵃ of the bolts 6 are forced into the eye portions 1ᵃ of the keepers 1 by the action of the spring 7. The hood is thus secured in position.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a device of the class described, the combination with the hood and frame member of an automobile, of a horizontal latch member having a beveled end portion slidably mounted on the inner side of said hood, a lug member rigidly secured to said latch member and adapted to extend through said hood and operate said latch member, and a substantially vertically extending resiliently restrained keeper connected to said frame and adapted to be engaged by said beveled portion and raised over said latch member for securing said hood relative to said frame.

2. In a device of the class described, the combination with the hood and frame member of an automobile, of a horizontal latch member having a beveled end portion slidably mounted on the inner side of said hood, a lug member rigidly secured to said latch member and adapted to extend through said hood and operate said latch member, and a vertically mounted resiliently restrained keeper extending through a portion of said frame to the back inner side of said hood and adapted to be engaged by said beveled end portion and raised into interlocking relation with said latch member.

3. In a device of the class described, the combination with the hood and frame member of an automobile, of a horizontal latch member having a beveled end portion slidably mounted on the inner side of said hood, a lug member rigidly secured to said latch member and adapted to extend through said hood and operate said latch member, and a resiliently restrained keeper reciprocally mounted on said frame and adapted to engage said latch member beveled end portion and raised into interlocking relation with said latch member.

4. In a device of the class described, the combination with the hood and frame of an automobile, of a keeper yieldably mounted in said frame and extending to the inner lower side of said hood, a horizontal latch member having a beveled end portion slidably mounted on the inside of said hood and adapted to engage said beveled portion and be raised into interlocking relation with said keeper and a portion of said latch member bent outwardly through said hood and adapted to serve as an operating means for said latch, and resilient means operatively connected to said latches adapted to force said latch to an interlocking position with said keeper.

5. In a device of the class described, the combination with the hood and frame of an automobile, of a pair of resiliently restrained keepers reciprocally mounted in said frame, a pair of horizontal latch members having beveled end portions adapted to engage and raise said keepers in interlocking relation with said latch members, said latch members being provided with lug portions adapted to extend through said hood and form a handle for said latch members, said lugs of said handle being mutually approachable and adapted to operate said latch members, and resilient means connected with said latch members adapted to force said latch members in an interlocking position with said keeper members.

In testimony whereof, I have hereunto set my hand at San Diego, California, this 29th day of January, 1927.

CHARLES H. E. REMONDINO.